(12) United States Patent
Li et al.

(10) Patent No.: US 12,250,279 B2
(45) Date of Patent: Mar. 11, 2025

(54) METHOD AND APPARATUS FOR MODERATING ABNORMAL USERS, ELECTRONIC DEVICE, AND STORAGE MEDIUM

(71) Applicant: BIGO TECHNOLOGY PTE. LTD., Singapore (SG)

(72) Inventors: Yiyong Li, Guangzhou (CN); Qiushi Huang, Guangzhou (CN); Zhun Sun, Guangzhou (CN); Xue Jing, Guangzhou (CN); Wei Xiang, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 19 days.

(21) Appl. No.: 18/245,653

(22) PCT Filed: Aug. 30, 2021

(86) PCT No.: PCT/CN2021/115230
§ 371 (c)(1),
(2) Date: Mar. 16, 2023

(87) PCT Pub. No.: WO2022/068493
PCT Pub. Date: Apr. 7, 2022

(65) Prior Publication Data
US 2023/0336637 A1  Oct. 19, 2023

(30) Foreign Application Priority Data
Sep. 30, 2020 (CN) .......................... 202011066006.0

(51) Int. Cl.
*H04L 67/50* (2022.01)
*G06F 17/18* (2006.01)
*H04L 67/1396* (2022.01)

(52) U.S. Cl.
CPC ............ *H04L 67/535* (2022.05); *G06F 17/18* (2013.01); *H04L 67/1396* (2022.05)

(58) Field of Classification Search
CPC .......................... H04L 67/535; H04L 67/1396
See application file for complete search history.

(56) References Cited

U.S. PATENT DOCUMENTS

| | | | | |
|---|---|---|---|---|
| 2005/0096867 A1* | 5/2005 | Manu | ................... | G06F 11/3684 702/181 |
| 2008/0174426 A1* | 7/2008 | Hackworth | ........... | G06F 3/0644 700/89 |

(Continued)

FOREIGN PATENT DOCUMENTS

| | | |
|---|---|---|
| CN | 103853841 A | 6/2014 |
| CN | 107517251 A | 12/2017 |

(Continued)

OTHER PUBLICATIONS

Extended European Search Report Communication Pursuant to Rule 62 EPC for European Application No. 21874154.4 dated Feb. 12, 2024, which is a foreign counterpart application to this application.

(Continued)

*Primary Examiner* — Jason D Recek
(74) *Attorney, Agent, or Firm* — Kolitch Romano Dascenzo Gates LLC

(57) ABSTRACT

Provided is a method for moderating abnormal users. The method includes: acquiring history behavior data of a plurality of to-be-moderated users, wherein the history behavior data includes behavior data of interactions of the plurality of to-be-moderated users; extracting a plurality of predetermined valid features from the history behavior data for each of the plurality of to-be-moderated users, wherein the predetermined valid features are features predetermined in sample data; calculating, based on predetermined probabili- (Continued)

ties of events associated with the plurality of valid features, a probability that each of the plurality of to-be-moderated users is the abnormal user; establishing a total probability function based on probabilities that the plurality of to-be-moderated users are the abnormal users; determining candidate users by solving, based on predetermined conditions, a maximum value of the total probability function; and determining the abnormal users by moderating the candidate users.

17 Claims, 4 Drawing Sheets

(56) References Cited

U.S. PATENT DOCUMENTS

| 2008/0282324 | A1 | 11/2008 | Hoal et al. |
| 2016/0261530 | A1 | 9/2016 | Cecchi et al. |
| 2017/0124464 | A1 | 5/2017 | Crabtree et al. |
| 2020/0128036 | A1* | 4/2020 | Sarzynski ............ G06F 21/6254 |
| 2022/0172090 | A1* | 6/2022 | Zheng ................. G06F 16/9024 |
| 2022/0253751 | A1* | 8/2022 | Yu ............................ G06N 5/01 |

FOREIGN PATENT DOCUMENTS

| CN | 110237530 A | 9/2019 |
| CN | 110929799 A | 3/2020 |
| CN | 111090813 A | 5/2020 |
| CN | 112199640 A | 1/2021 |

OTHER PUBLICATIONS

Substantive Report of counterpart Saudi Arabian application No. 523440093 issued on Mar. 3, 2024.

International Search Report of the International Searching Authority for State Intellectual Property Office of the People's Republic of China in PCT application No. PCT/CN2021/115230 issued on Dec. 2, 2021, which is an international application to which this application claims priority.

* cited by examiner

METHOD AND APPARATUS FOR MODERATING ABNORMAL USERS, ELECTRONIC DEVICE, AND STORAGE MEDIUM

CROSS-REFERENCE TO RELATED APPLICATIONS

This application is a U.S. national stage of international application No. PCT/CN2021/115230, filed on Aug. 30, 2021, which is based on and claims the priority to Chinese Patent Application No. 202011066006.0, filed on Sep. 30, 2020, the disclosures of which are incorporated herein by references in their entireties.

TECHNICAL FIELD

The present disclosure relates to the field of content moderation technologies, and in particular, relates to a method and apparatus for moderating abnormal users, an electronic device and a storage medium.

BACKGROUND OF THE INVENTION

With developments of the Internet technologies, a variety of video platforms are available for users. The users can watch or upload videos over the video platforms, such as the video platforms for short videos, live streams, and the like. However, due to diversity of the users and needs to maintain healthy and positive network environments, it is necessary to moderate users to determine whether the users are abnormal users.

SUMMARY OF THE INVENTION

Embodiments of the present disclosure provide a method and apparatus for moderating abnormal users, an electronic device and a storage medium.

The embodiments of the present disclosure provide a method for moderating abnormal users. The method includes:
  acquiring history behavior data of a plurality of to-be-moderated users, wherein the history behavior data includes behavior data of interactions of the plurality of to-be-moderated users;
  extracting a plurality of predetermined valid features from the history behavior data for each of the plurality of to-be-moderated users, wherein the predetermined valid features are features predetermined in sample data;
  calculating, based on predetermined probabilities of events associated with the plurality of valid features, a probability that each of the plurality of to-be-moderated users is the abnormal user;
  establishing a total probability function based on probabilities that the plurality of to-be-moderated users are the abnormal users;
  determining candidate users by solving, based on predetermined conditions, a maximum value of the total probability function; and determining the abnormal users by moderating the candidate users.

The embodiments of the present disclosure provide an electronic device for moderating abnormal users. The electronic device for moderating abnormal users includes:
  one or more processors;
  a memory, configured to store one or more programs; wherein the one or more processors, when loading and running the one or more programs, are caused to perform the above method for moderating abnormal users.

The embodiments of the present disclosure provide a non-volatile computer-readable storage medium. The non-volatile computer-readable storage medium stores one or more computer programs, wherein the one or more computer programs, when loaded and run by a processor, causes the processor to perform the above method for moderating abnormal users.

DETAILED DESCRIPTION OF THE INVENTION

The present disclosure is described in conjunction with the accompanying drawings and the embodiments.

In moderation of the users, pedophilia users or other rule-violating users are determined as the abnormal users. For protection of juveniles, the pedophilia users are major targets for moderation, and it is necessary to detect the pedophilia users from a large number of users and penalize the detected pedophilia users. However, inaccurate information is present in video data. For example, whether a video needs to be prohibited from the juveniles or whether a video is a pornographic video can fail to be determined. In addition, the pedophilia users have adversarial behaviors, for example, mutual follow, like, and other interaction behaviors among the pedophilia users. The pedophilia users follow each other and divulge information to escape from moderation, or the pedophilia users use variations of pornography understandable by the pedophilia users and even create pedophilia words specific to and only acknowledgeable by the pedophilia users to escape from moderation, such that the pedophilia users fail to be moderated due to failure to extract valid features associated with the pedophilia.

In addition, a method for classifying the users includes acquiring classification of the users by inputting features of the users. Behaviors and a classification result of the users do not affect classification results of other users, and are not affected by the behaviors and the classification results of the other users. Thus, an algorithm for classifying the users fails to dynamically combine the interaction behaviors between the pedophilia users and thus fails to determine whether the users are pedophilia users.

In summary, in some practices, the pedophilia users fail to be moderated and penalized effectively and accurately because of inaccurate information, failure to extract valid features due to the adversarial behaviors of the pedophilia users, and failure to take consideration of interaction behaviors between the pedophilia users when classification of single users using a classification algorithm.

First Embodiment

Figure 1:
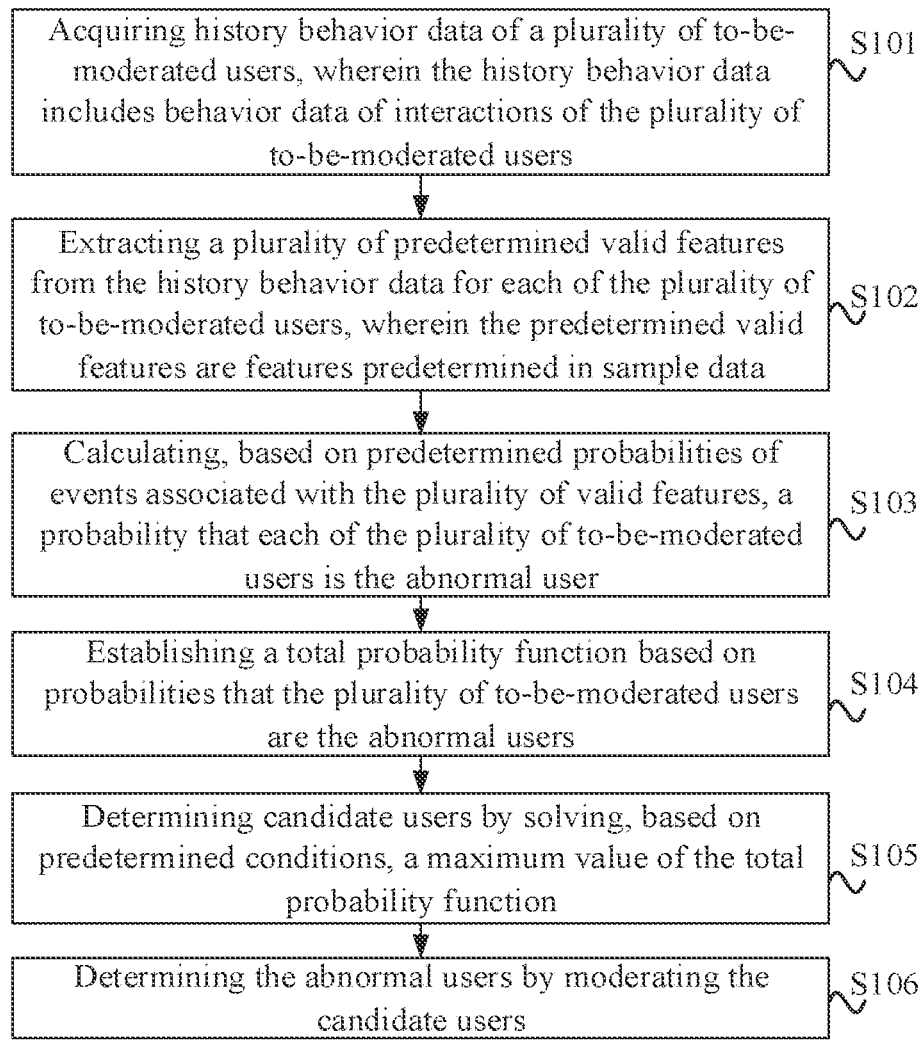
FIG. 1 is a flowchart of a method for moderating abnormal users according to a first embodiment of the present disclosure.

FIG. 1 is a flowchart of a method for moderating abnormal users according to a first embodiment of the present disclosure. The embodiments of the present disclosure are applicable to a case of determining pedophilia users or other rule-violating users by moderating abnormal users. The method is performed by an apparatus for moderating abnormal users in the embodiments of the present disclosure, and the apparatus for moderating abnormal users is achieved by hardware or software and is integrated in an electronic device in the embodiments of the present disclosure. As shown in FIG. 1, the method for moderating abnormal users in the embodiments of the present disclosure includes the following processes.

In S101, history behavior data of a plurality of to-be-moderated users is acquired, wherein the history behavior data includes behavior data of interactions of the plurality of to-be-moderated users.

In the embodiments of the present disclosure, the abnormal users are pedophilia users or other rule-violating users. The method for moderating abnormal users is illustrated by taking the pedophilia users as an example in the embodiments of the present disclosure. The to-be-moderated users are users on short video and living streaming platforms, and the to-be-moderated users are a specific part of users or all users.

The history behavior data includes data of behaviors of the to-be-moderated users on the short video and live stream platforms, for example, data recording videos watched by the users, videos liked by the users, comments, and other users followed by the users. The history behavior data further includes data of other users for the behaviors of the to-be-moderated users, for example, data of the other users that follow the to-be-moderated users and like, watch, and comment the videos and comments posted by the to-be-moderated users, and the like. The history behavior data further includes information of the to-be-moderated users, for example, user identifiers (UIDs) and genders of the to-be-moderated users, and the like.

In practical application, the history behavior data of the to-be-moderated users is acquired through data event tracking by setting the data event tracking in the short video and live stream platforms, or the history behavior data of the to-be-moderated users is acquired by user logs, and the like, which is not limited in the embodiments of the present disclosure.

In S102, a plurality of predetermined valid features are extracted from the history behavior data for each of the plurality of to-be-moderated users, wherein the predetermined valid features are features predetermined in sample data.

In the embodiments of the present disclosure, a specific number of sample users are first determined, and the specific number of sample users are users with normal user tags and abnormal user tags. Upon determination of the specific number of sample users, history behavior data of the specific number of sample users is acquired, behavior features are extracted from the history behavior data of the specific number of sample users, and validities of the behavior features are determined. The behavior features are determined as valid features in response to the behavior features being valid, and events associated with the valid features are determined. Probabilities that the users are the abnormal users upon occurrence of the events associated with the valid features are calculated by a statistical algorithm, and the probabilities are determined as the predetermined probabilities. Eventually, the plurality of valid features and the sample data of the predetermined probabilities of the events associated with the plurality of valid features are acquired. Upon moderation of the to-be-moderated users, and determination of the abnormal users and the normal users, the moderated users are determined as the sample users to update the sample data.

In the embodiments of the present disclosure, taking the abnormal users being the pedophilia users as an example, the valid features are prohibited words associated with the pedophilia in comments of the to-be-moderated users, pornographic videos featuring the juveniles that are liked, commented, or watched by the to-be-moderated users, pornographic videos featuring the juveniles that are posted by the to-be-moderated users, and the like. Then, corresponding predetermined valid features are extracted from the behavior data of the to-be-moderated users, such as commenting, watching, liking, posting, and the like.

In S103, a probability that each of the plurality of to-be-moderated users is the abnormal user is determined based on predetermined probabilities of events associated with the plurality of valid features.

In the embodiments of the present disclosure, the sample data includes the plurality of predetermined valid features and predetermined probabilities of the events associated with the plurality of predetermined valid features. For each of the plurality of to-be-moderated users, upon extraction of the plurality of predetermined valid features, the probability that each of the plurality of to-be-moderated users is the abnormal user is determined by summing the predetermined probabilities of the events associated with the plurality of predetermined valid features.

In S104, a total probability function is established based on probabilities that the plurality of to-be-moderated users are the abnormal users.

The total probability function is a sum of the probabilities that the plurality of to-be-moderated users are the abnormal users. For the total probability function, a function value of the total probability function changes in the case that the to-be-moderated users change from the abnormal users to normal users, or from the normal users to abnormal users.

In S105, candidate users are determined by solving, based on predetermined conditions, a maximum value of the total probability function.

In practical application, a proportion of the abnormal users to the specific number of sample users is acquired by performing statistical calculation on the sample users, and a number of abnormal users in the to-be-moderated users is acquired by multiplying the proportion by a total number of to-be-moderated users. A recall rate is also provided, and a product of the recall rate and the total number of to-be-moderated users is calculated. Thus, the constrains are: when the function value of the total probability function is maximum, a number of candidate users is greater than the product of the recall rate and the total number of to-be-moderated users and is less than the number of abnormal users in the to-be-moderated users.

Based on the above constrains, the to-be-moderated users are first organized to a set of abnormal users and a set of normal users. Assuming that the to-be-moderated users in the set of abnormal users are the abnormal users, and the to-be-moderated users in the set of normal users are the normal users, a first function value of the total probability function is calculated based on the set of abnormal users and the set of normal users.

Then, the set of normal users is traversed, and first to-be-moderated users currently traversed in the set of normal users are determined as the abnormal users. Upon each traverse of the set of normal users, the set of abnormal users is traversed, and second to-be-moderated users currently traversed in the set of abnormal users are determined as the normal users. Upon each traverse of the set of abnormal users, a plurality of second function values are acquired by calculating function values of the total probability function based on the current set of abnormal users and the current set of normal users, and a minimum second function value is determined in the plurality of second function values. In the case that the minimum second function value is greater than the first function value, second to-be-moderated users corresponding to the minimum second function value are determined in the set of abnormal users, the second to-be-moderated users corresponding to the minimum second function value are determined as the normal users, and shifted to the set of normal users. The currently traversed first to-be-moderated users are determined as the abnormal users and shifted from the set of normal users to the set of abnormal users. Processes of traversing the set of normal users, and determining the first to-be-moderated users currently traversed in the set of normal users as the abnormal users are returned until the set of normal users is traversed. A number of to-be-moderated users in the set of abnormal users is less than a total number of abnormal users in all the to-be-moderated users, and is greater than the product of the total number and the recall rate. The total number is a product of a predetermined proportion of the abnormal users and the number of to-be-moderated users, and the to-be-moderated users in the final set of abnormal users are the candidate users.

In S106, the abnormal users are determined by moderating the candidate users.

Upon determination of the candidate users, the user identifiers of the candidate users are sent to a moderation backend, such that the abnormal users are determined by artificially or manually moderating the candidate users in the moderation backend.

In the embodiments of the present disclosure, the history behavior data of the plurality of to-be-moderated users includes the data of the interaction behaviors of the plurality of to-be-moderated users. Upon setting of the valid features based on the sample data, the valid features are extracted based on the history behavior data, and the probabilities that the to-be-moderated users are the abnormal users are calculated. The total probability function is established based on the probabilities that the plurality of to-be-moderated users are the abnormal users, the candidate users are determined by solving, based on the predetermined conditions, the maximum value of the total probability function, and the abnormal users are determined by moderating the candidate users. The valid features are predetermined based on the sample data, and the valid features are extracted from the history behavior data and converted to the probabilities of the events associated with the valid features, such that the valid features for moderating the abnormal users are extracted based on the history data of the interactions of the plurality of to-be-moderated users, the features are converted to probability calculation, and the problem that the accuracy of moderating the abnormal users is affected by the inaccurate data information is solved. In addition, the candidate users are determined by establishing and solving the total probability function for all to-be-moderated users, such that the interaction behaviors between the to-be-moderated users are used, and the classification results of the to-be-moderated users are mutually affected. Thus, the candidate users are accurately determined to be moderated.

Second Embodiment

Figure 2:
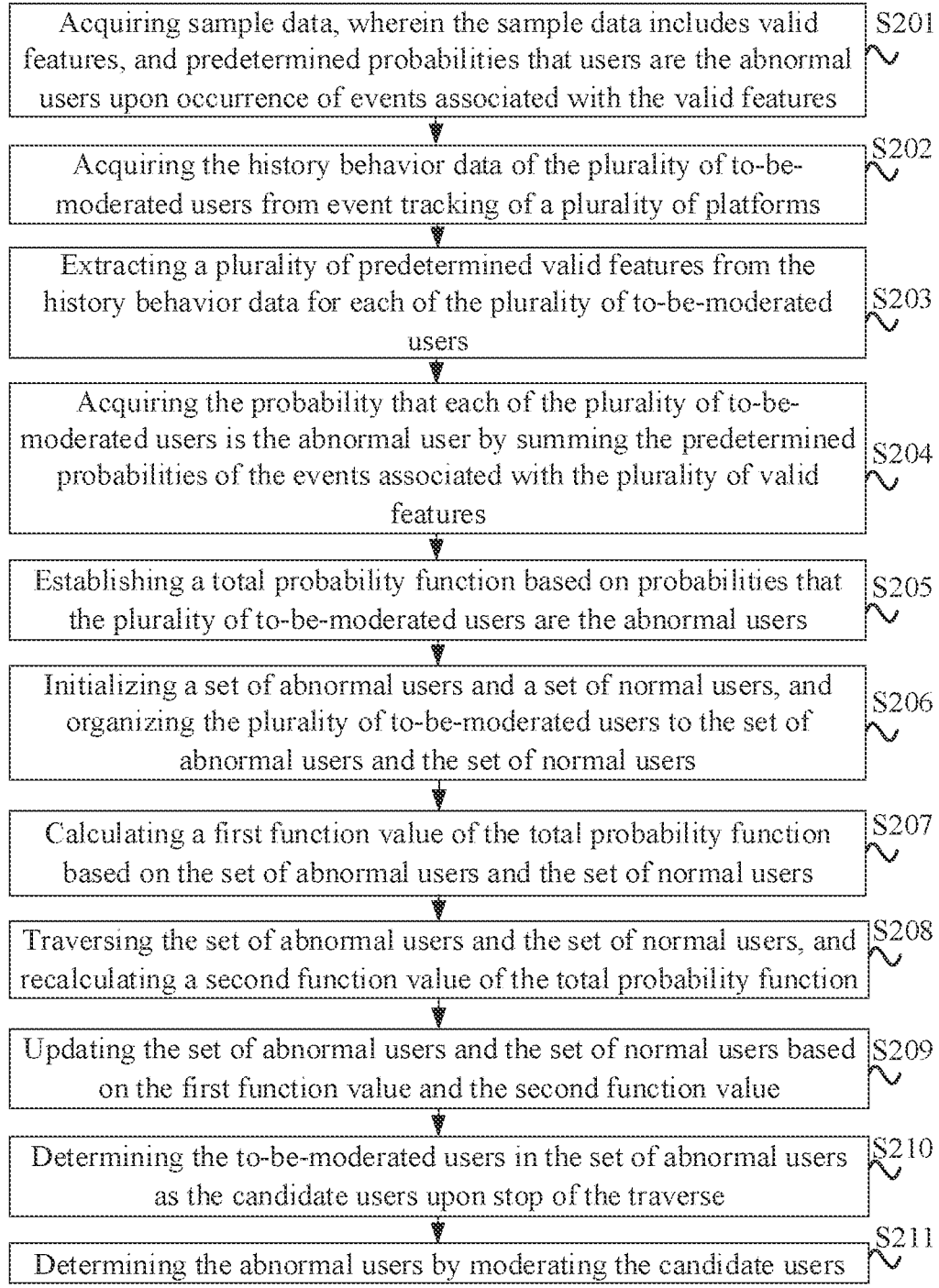
FIG. 2 is a flowchart of a method for moderating abnormal users according to a second embodiment of the present disclosure.

FIG. 2 is a flowchart of a method for moderating abnormal users according to a second embodiment of the present disclosure. The embodiments are described on the basis of the first embodiments. As shown in FIG. 2, the method for moderating abnormal users in the embodiments of the present disclosure includes the following processes.

In S201, the sample data is acquired, wherein the sample data includes valid features, and predetermined probabilities that users are the abnormal users upon occurrence of events associated with the valid features.

In the embodiments of the present disclosure, the sample data is predetermined based on the statistics. The sample data includes the valid features, and the predetermined probabilities that the users are the abnormal users upon occurrence of the events associated with the valid features. In some embodiments, the history behavior data of a specific number (for example, 1000) of sample users is acquired, and the sample users are users with abnormal user tags and normal user tags. A plurality of valid features are extracted from the history behavior data of the sample users, and probabilities that the sample users are the abnormal users upon occurrence of the events associated with the valid features are determined as the predetermined probabilities.

In extraction of the valid features, a plurality of behavior features are extracted from the history behavior data of the sample users. For each of the plurality of behavior features, a first user number of sample users that are the abnormal users, including the each of the plurality of behavior features is acquired, and a second user number of sample users that are the normal users, including the each of the plurality of behavior features is acquired. A third user number of abnormal users and a fourth user number of normal users in the specific number of sample users are acquired, a first ratio of the first user number to the third user number and a second ratio of the second user number to the fourth user number are calculated, an absolute value of a difference value of the first ratio and the second ratio is calculated, and the plurality of behavior features are determined as the valid features in response to the absolute value being greater than a predetermined threshold.

In some embodiments, the abnormal users are moderated to determine the pedophilia users. Assuming that N behavior features are extracted from the history behavior data of the sample users, a behavior feature B is a prohibited word in the comments of the user, a proportion of the pedophilia users, including the behavior feature B, in the specific number of sample users to all pedophilia users is P_1, a proportion of the normal users, including the behavior feature B, in the specific number of sample users to all normal users is P_2. In the case that |P_1-P_2|>d (d is a threshold, and is set as 0.02), the behavior feature B is differentiated, and thus the behavior feature B is determined to be valid. The behavior feature B is determined as a predetermined valid feature. Likewise, the N behavior features are traversed, and a plurality of valid features and the probabilities of the events associated with the valid features are acquired. In some embodiments, the events associated with the plurality of valid features are as follows.

In event $A_0$, the user is pedophilia; in event $A_1$, the user likes pornographic videos featuring juveniles; in event $A_2$, the comment sent by the user includes prohibited words; in event $A_3$, the user follows an account of the pedophilia user; in event $A_4$, the user is followed by an account of the pedophilia user; in event $A_5$, the user watches pornographic videos featuring juveniles; in event $A_6$, the user shares pornographic videos featuring juveniles; in event $A_7$, a number of liked videos of the user divided by a number of posted videos is greater than 30; in event $A_8$, a number of liked videos of the user divided by a number of posted videos is less than 30; in event $A_9$, the user comments pornographic videos featuring juveniles; in event $A_{10}$, the user is a male; in event $A_{11}$, the user is a female; in event $A_{12}$, a gender of the user is NULL; and $A^c$ represents the event A is not present.

In the case that the history behavior data of each of the plurality of to-be-moderated users includes above events, the to-be-moderated user has $2^8 \times 3=768$ events, denoted as $B_j$, $1 \leq j \leq 768$. Then, a probability that the to-be-moderated user is the abnormal user under each event is $P(A_0|A_n)$, $P(A_0|A_n)$ represents the probability that the to-be-moderated user is the abnormal user in the case that the history behavior data of the to-be-moderated user includes the event $A_n$. For example, in the above examples of events, $P(A_0|A_6)=0.015$ represents that the probability that the to-be-moderated user is the pedophilia user is 1.5% in the case that the to-be-moderated user shares pornographic videos featuring juveniles. As the number of sample users is specified, and the numbers of different events are counted in the history behavior data of all sample users, probabilities that the sample users are the pedophilia users upon occurrence of different events are analyzed and calculated based on the history behavior data of all sample users, and the probabilities that the sample users are the pedophilia users upon occurrence of different events are described in detail in the embodiments of the present disclosure.

In practical application, more valid features are extracted, and more events are set, and numbers and comments of the valid features and the events are not limited in the embodiments of the present disclosure.

In the embodiments of the present disclosure, the behavior features are extracted from the history behavior data of the sample users, the valid features are determined, and the valid features are set for pedophilia or other rule-violating behaviors to detect the abnormal users, such that the problem that the valid features associated with the pedophilia fail to be extracted to detect the pedophilia users who have adversarial behaviors, and intentionally use variations of pornography understandable by the pedophilia users, and even create pedophilia words specific to and only acknowledgeable by the pedophilia users to escape from moderation in some practices is solved. In addition, the valid features are set for the pedophilia users to detect the pedophilia users, such that the accuracy of moderating the pedophilia users is improved.

In S202, the history behavior data of the plurality of to-be-moderated users is acquired from event tracking of a plurality of platforms.

The history behavior data of the to-be-moderated users is acquired through data event tracking by setting the data event tracking in the short video and living streaming platforms. The history behavior data includes at least one of: user genders, videos liked by the users, comments by the users, accounts followed by the users, accounts following the users, videos shared by the users, a number of videos liked by the users, a number of videos posted by the users. The history behavior data further includes other behavior data.

In S203, a plurality of predetermined valid features are extracted from the history behavior data for each of the plurality of to-be-moderated users.

Upon determination of the sample data based on the sample users, wherein the sample data includes the predetermined valid features for moderating the abnormal users, corresponding predetermined valid features are extracted from the history behavior data of each of the plurality of to-be-moderated users.

In S204, the probability that each of the plurality of to-be-moderated users is the abnormal user is acquired by summing the predetermined probabilities of the events associated with the plurality of valid features.

Upon determination of the predetermined probabilities of the events associated with the plurality of predetermined valid features in the sample data based on the sample users, the probability that each of the plurality of to-be-moderated users is the abnormal user is acquired by summing the predetermined probabilities of the events associated with the plurality of valid features of the to-be-moderated users for each of the plurality of to-be-moderated users.

In S205, a total probability function is established based on probabilities that the plurality of to-be-moderated users are the abnormal users.

The total probability function is acquired by summing of the probabilities that the plurality of to-be-moderated users are the abnormal users. For the total probability function, in the case that the to-be-moderated users change from the abnormal users to normal users, or from the normal users to abnormal users, a probability that the to-be-moderated user is the abnormal user changes, that is, a function value of the total probability function changes.

In S206, a set of abnormal users and a set of normal users are initialized, and the plurality of to-be-moderated users are organized to the set of abnormal users and the set of normal users.

In some embodiments, all to-be-moderated users are determined as the normal users, a set of to-be-moderated users determined by solving the maximum value of the total probability function is determined as the set of abnormal users, a set of to-be-moderated users, other than the set of abnormal users, in the plurality of to-be-moderated users is determined as the set of normal users.

A total number of to-be-moderated users is $num(\Omega)$, a proportion of the abnormal users is determined as s based on the specific number of sample users, and the $num(\Omega_1)$ of abnormal users in the to-be-moderated users is determined by calculating a product of the proportion s and the total number $num(\Omega)$ of the to-be-moderated users. In the case that all to-be-moderated users are the normal users, the probability that each to-be-moderated user is the abnormal user is calculated, such that a set of $num(\Omega_1)$ to-be-moderated users determined by solving the maximum value of the total probability function is determined as the set of abnormal users P, and a set of other to-be-moderated users is determined as the set of normal users Q.

In some embodiments, classification results of the plurality of to-be-moderated users are acquired by inputting the history behavior data of the plurality of to-be-moderated users to a pretrained classification model, the classification results are a probability that each of the plurality of to-be-moderated users is the abnormal user or the normal user, and each of the plurality of to-be-moderated users is organized to the set of abnormal users or the set of normal users based on the probability that each of the plurality of to-be-moderated users is the abnormal user or the normal user in the classification results. For example, the to-be-moderated users are first classified by training a regression neural network, a deep neural network, a cyclic neural network, and other networks, classification probabilities that the plurality of to-be-moderated users are the abnormal users or the normal users are acquired, a set formed by num($\Omega_1$) to-be-moderated users with classification probabilities that the to-be-moderated users are the abnormal users being at the top is determined as the set of abnormal users, and a set of other to-be-moderated users is determined as the set of normal users.

In practical application, the set of abnormal users and the set of normal users may be initialized in other manners.

In S207, a first function value of the total probability function is calculated based on the set of abnormal users and the set of normal users.

The first function value of the total probability function is calculated by determining the to-be-moderated users in the set of abnormal users as the abnormal users and the to-be-moderated users in the set of normal users as the normal users. As the total probability function is a sum of the probabilities of all to-be-moderated users, in the case that the to-be-moderated users are initialized as the normal users and the abnormal users, the probability of each to-be-moderated user changes, and the value of the total probability function changes to acquire the first function value $S_0$.

In S208, the set of abnormal users and the set of normal users are traversed, and a second function value of the total probability function is recalculated.

In the embodiments of the present disclosure, upon initialization of the set of normal users and the set of abnormal users, the set of normal users is traversed, and first to-be-moderated users currently traversed in the set of normal users are determined as the abnormal users. Upon the traverse of the first to-be-moderated users in the set of normal users, the set of abnormal users is traversed, and second to-be-moderated users currently traversed in the set of abnormal users are determined as the normal users. Upon the traverse of the second to-be-moderated users in the set of abnormal users, the second function value $S_1$ of the total probability function is calculated based on the current set of abnormal users and the current set of normal users. A plurality of second function values $S_1$ are acquired by repeating processes of traversing the set of abnormal users, determining the second to-be-moderated users currently traversed in the set of abnormal users as the normal users, and calculating, upon the traverse of the second to-be-moderated users in the set of abnormal users, the second function value of the total probability function based on the current set of abnormal users and the current set of normal users until the set of abnormal users is traversed. A minimum second function value $S_{1min}$ is determined in the plurality of second function values $S_1$.

In S209, the set of abnormal users and the set of normal users are updated based on the first function value and the second function value.

The minimum second function value is determined in the plurality of second function values acquired by each traverse of the set of abnormal users. In response to the minimum second function value being greater than the first function value, the second to-be-moderated users corresponding to the minimum second function value is determined in the set of abnormal users, and the second to-be-moderated users corresponding to the minimum second function value are determined as the normal users and shifted to the set of normal users. The currently traversed first to-be-moderated users are determined as the abnormal users and shifted from the set of normal users to the set of abnormal users, and processes of traversing the set of normal users, and determining the first to-be-moderated users currently traversed in the set of normal users as the abnormal users are returned.

For clearer understanding of the processes of traversing and updating the set of normal users and the set of abnormal users, detailed description is given hereinafter with reference to the embodiments.

In some embodiments, the set of normal users is denoted as Q={Q1, Q2, . . . Qn}, and all to-be-moderated users Qn in the set of normal users Q are the normal users. The set of abnormal users is denoted as P={P1, P2, . . . Pm}, and all to-be-moderated users Pm in the set of abnormal users P are the abnormal users. The processes of traversing the set of abnormal users and the set of normal users are as follows.

In S1, the to-be-moderated user Q1 in the set of normal users Q is traversed, and the to-be-moderated user Q1 is changed to the abnormal user.

In S2, the to-be-moderated user P1 in the set of abnormal users P is traversed, the to-be-moderated user P1 is changed to the normal user, the second function value $S_{11}$ of the total probability function is calculated based on the current set of abnormal users and the current set of normal users, and then the to-be-moderated user P1 is changed to the abnormal user.

In S3, the to-be-moderated user P2 in the set of abnormal users P is traversed, the to-be-moderated user P2 is changed to the normal user, the second function value $S_{12}$ of the total probability function is calculated based on the current set of abnormal users and the current set of normal users, and then the to-be-moderated user P2 is changed to the abnormal user, and so on. One second function value $S_{1m}$ is acquired upon each traverse of to-be-moderated user Pm in the set of abnormal users P, and a plurality of second function values are acquired upon the traverse of the set of abnormal users P.

In S4, a minimum second function value $S_{1min}$ is determined in the plurality of second function values $S_{1m}$.

In S5, in response to the minimum second function value $S_{1min}$ being greater than the first function value $S_0$, the to-be-moderated users Pm corresponding to the minimum second function value $S_{1min}$ in the set of abnormal users P are determined as the normal users and shifted to the set of normal users, the currently traversed to-be-moderated users Qn in the set of normal users Q are determined as the abnormal users and shifted to the set of abnormal users P, and S1 is returned. The next to-be-moderated user in the set of normal users Q is further traversed, and S1 to S5 are repeated until the to-be-moderated users in the set of normal users Q are traversed.

As known from the above traversing process, upon update of the set of normal users and the set of abnormal users, the function value of the total probability function is increased to solve the maximum value, and the condition of stopping the traverse is that the number of to-be-moderated users in the set of abnormal users is less than the total number of abnormal users in the to-be-moderated users, and is greater than a product of the total number and the recall rate upon the traverse of the set of normal users. The total number is a product of a predetermined proportion of the abnormal users and the number of to-be-moderated users, and the total probability function is solved as follows.

$$\max_{V_1 \subset \Omega} \sum_{x_i \in V_1} P(x_i)$$

s.t.

$r \times num(\Omega_1) \le num(V_1) \le num(\Omega_1);$ $\forall x_i \in \Omega, P(x_i) = P(A_0 \mid B_j), 1 \le j \le 768$ In the above formula, $P(x_i)$ represents the probability that an $i^{th}$ to-be-moderated user is the abnormal user, n represents a set of all to-be-moderated users, s.t. (subject to) represents one condition being met, $\forall x_i \in \Omega$ represents any to-be-moderated user in the set of all to-be-moderated users, r represents a predetermined recall rate, V1 represents a set of abnormal users upon the traverse, $num(V_1)$ represents a number of abnormal users in the set of abnormal users, $num(\Omega_1)$ represents a number of abnormal users in the to-be-moderated users, $num(\Omega_1)=s \times num(\Omega)$, and s represents a predetermined proportion of the abnormal users.

In S210, the to-be-moderated users in the set of abnormal users are determined as the candidate users upon stop of the traverse.

The condition of stopping the traverse is that the number of to-be-moderated users in the set of abnormal users is less than the total number of abnormal users in the to-be-moderated users, and is greater than a product of the total number and the recall rate upon the traverse of the set of normal users. The total number is a product of a predetermined proportion of the abnormal users and the number of to-be-moderated users.

The to-be-moderated users in the set of abnormal users determined by completing the traverse and meeting the predetermined condition are the candidate users, and the candidate users are moderated artificially.

In S211, the abnormal users are determined by moderating the candidate users.

In the embodiments of the present disclosure, the user identifiers of the candidate users are sent to the moderation backend, such that the candidate users are moderated in the moderation backend. In the case that the candidate users are determined as the abnormal users, such as the pedophilia users by artificially moderating, the candidate users are identified as the abnormal users, otherwise, identified as the normal users.

In the embodiments of the present disclosure, upon determination of the abnormal users from the candidate users by artificial moderation, abnormal user tags are assigned for the abnormal users, normal user tags are assigned for the users, other than the abnormal users, in the plurality of to-be-moderated users, the users with the abnormal user tags or normal user tags are determined as the sample users, and the sample data is updated.

In the embodiments of the present disclosure, the sample data including valid features and predetermined probabilities that users are the abnormal users upon occurrence of events associated with the valid features is acquired. Upon acquisition of the history behavior data of the plurality of to-be-moderated users from a plurality of platforms by event tracking, a plurality of predetermined valid features are extracted from the history behavior data for each of the plurality of to-be-moderated users, the probability that each of the plurality of to-be-moderated users is the abnormal user is acquired by summing the predetermined probabilities of the events associated with the plurality of valid features, and a total probability function is established based on probabilities that the plurality of to-be-moderated users are the abnormal users. Upon initialization of a set of abnormal users and a set of normal users, a first function value of the total probability function is calculated based on the set of abnormal users and the set of normal users, the set of abnormal users and the set of normal users are traversed, and a second function value of the total probability function is recalculated. The set of abnormal users and the set of normal users are updated based on the first function value and the second function value. In the case that a maximum function value of the total probability function is acquired upon acquisition of the set of normal users on the predetermined condition, the to-be-moderated users in the set of abnormal users are determined as the candidate users, and the abnormal users are determined by moderating the candidate users. The valid features are predetermined based on the sample data, and the valid features are extracted from the history behavior data and converted to the probabilities of the events associated with the valid features, such that the valid features for moderating the abnormal users are extracted based on the history data of the interactions of the plurality of to-be-moderated users, the features are converted to probability calculation, and the problem that the accuracy of moderating the abnormal users is affected by the inaccurate data information is solved. In addition, the candidate users are determined by establishing and solving the total probability function for all to-be-moderated users, such that the interaction behaviors between the to-be-moderated users are used, and the classification results of the to-be-moderated users are mutually affected. Thus, the candidate users are accurately determined to be moderated.

The behavior features are extracted from the history behavior data of the sample users, the valid features are determined, and the valid features are set for pedophilia or other rule-violating behaviors to moderate the abnormal users, such that the problem that the valid features associated with the pedophilia fail to be extracted to detect the pedophilia users as the pedophilia users have adversarial behaviors, and intentionally use variations of pornography understandable by the pedophilia users, and even create pedophilia words specific to and only acknowledgeable by the pedophilia users to escape from moderation in some practices is solved. In addition, the valid features are set for the pedophilia users to detect the pedophilia users, such that the accuracy of moderating the pedophilia users is improved.

Upon determination of the abnormal users, the abnormal user tags are assigned for the abnormal users, and the normal user tags are assigned for the normal users. The users with the tags are determined as the sample users, and the valid features of the sample data and the probabilities that the users are the abnormal users upon occurrence of the events associated with the valid features are updated. Thus, the sample data is dynamically updated to dynamically solve the candidate users, and data resources of the sample users are increased, and a cost of acquiring the sample users is reduced.

Third Embodiment

Figure 3:
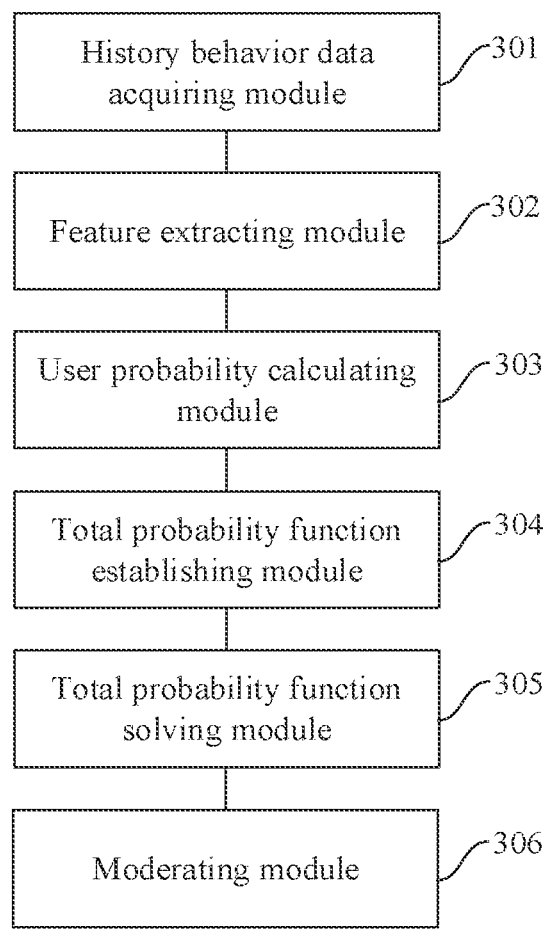
FIG. 3 is a block diagram of an apparatus for moderating abnormal users according to a third embodiment of the present disclosure.

FIG. 3 is a block diagram of an apparatus for moderating abnormal users according to a third embodiment of the present disclosure. As shown in FIG. 3, the apparatus for moderating abnormal users in the embodiments of the present disclosure includes the following modules.

A history behavior data acquiring module 301, configured to acquire history behavior data of a plurality of to-bemoderated users, wherein the history behavior data includes behavior data of interactions of the plurality of to-be-moderated users; a feature extracting module 302, configured to extract a plurality of predetermined valid features from the history behavior data for each of the plurality of to-be-moderated users, wherein the predetermined valid features are features predetermined in sample data; a user probability calculating module 303, configured to calculate, based on predetermined probabilities of events associated with the plurality of valid features, a probability that each of the plurality of to-be-moderated users is the abnormal user; a total probability function establishing module 304, configured to establish a total probability function based on probabilities that the plurality of to-be-moderated users are the abnormal users; a total probability function solving module 305, configured to determine candidate users by solving, based on predetermined conditions, a maximum value of the total probability function; and a moderating module 306, configured to determine the abnormal users by moderating the candidate users.

The apparatus for moderating abnormal users in the embodiments of the present disclosure performs the method for moderating abnormal users in the first or second embodiments of the present disclosure, and have corresponding functional modules and effects of the method.

Fourth Embodiment

Figure 4:
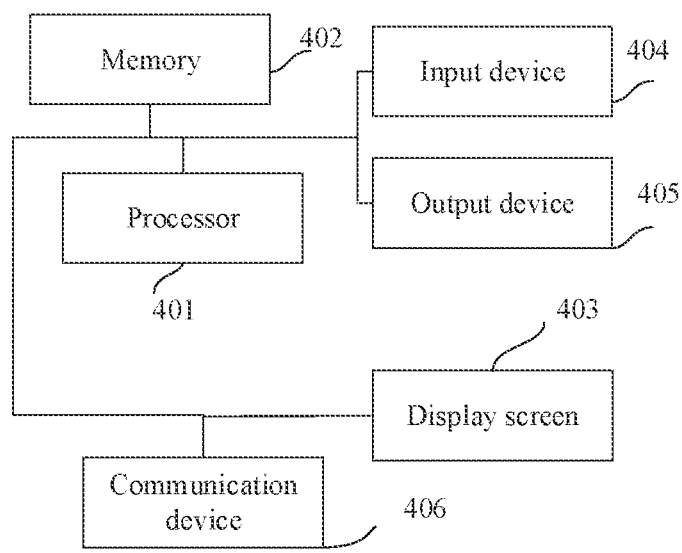
FIG. 4 is a schematic structural diagram of an electronic device according to a fourth embodiment of the present disclosure.

FIG. 4 is a schematic structural diagram of an electronic device according to a fourth embodiment of the present disclosure. As shown in FIG. 4, the electronic device includes: a processor 401, a memory 402, a display screen 403 with a touch function, an input device 404, an output device 405, and a communication device 406. One or more processors 401 are configured in the electronic device, and FIG. 4 is illustrated by taking one processor 401 as an example. The processor 401, the memory 402, the display screen 403, the input device 404, the output device 405, and the communication device 406 in the electronic device are connected by a bus or other manner, and FIG. 4 is illustrated by taking the bus as an example. The electronic device is used to perform the method for moderating abnormal users in any embodiment of the present disclosure.

A non-volatile computer-readable storage medium is provided in the embodiments of the present disclosure. The instructions in the storage medium, when loaded and executed by a processor of an electronic device, causes the electronic device to perform the method for moderating abnormal users as defined in the above embodiments.

For the embodiments of the apparatus, the electronic device, and the storage medium, the descriptions are basically the same as the method embodiments, and thus are simple, and references may be made to the descriptions of the method embodiments.

In the descriptions herein, the description of the terms "an embodiment," "some embodiments," "an examples," "the examples," or "some examples," and the like means that the description of the characteristics, structure, materials, or features combined with the embodiment or example are included in at least one embodiment or example of the present disclosure. Herein, the schematic descriptions of the above terms do not necessarily refer to identical embodiments or examples. Furthermore, the described characteristics, structures, materials, or features may be combined in an appropriate manner in any one or more embodiments or examples.

The invention claimed is:

1. A method for moderating abnormal users, applicable to a device achieved by hardware or software and is integrated in an electronic device, the method comprising:

acquiring history behavior data of a plurality of to-be-moderated users, wherein the history behavior data comprises behavior data of interactions of the plurality of to-be-moderated users;

extracting a plurality of predetermined valid features from the history behavior data for each of the plurality of to-be-moderated users, wherein the predetermined valid features are features predetermined in sample data;

calculating, based on predetermined probabilities of events associated with the plurality of valid features, a probability that each of the plurality of to-be-moderated users is an abnormal user;

establishing a total probability function based on probabilities that the plurality of to-be-moderated users are the abnormal users;

determining candidate users by solving, based on predetermined conditions, a maximum value of the total probability function; and determining the abnormal users by moderating the candidate users;

wherein determining the candidate users by solving, based on the predetermined conditions, the maximum value of the total probability function comprises:

initializing a set of abnormal users and a set of normal users, and organizing the plurality of to-be-moderated users to the set of abnormal users and the set of normal users, wherein a probability that each of the plurality of to-be-moderated users is the abnormal user or the normal user is acquired by inputting the history behavior data of the plurality of to-be-moderated users to a pretrained classification model, and each of the plurality of to-be moderated users is organized to the set of abnormal users or the set of normal users based on the probability that each of the plurality of to-be-moderated users is the abnormal user or the normal user;

calculating a first function value of the total probability function based on the set of abnormal users and the set of normal users;

traversing the set of abnormal users and the set of normal users, and recalculating a second function value of the total probability function;

updating the set of abnormal users and the set of normal users based on the first function value and the second function value, returning to processes of traversing the set of abnormal users and the set of normal users, and recalculating the second function value of the total probability function until the set of normal users is traversed, wherein a number of the to-be-moderated users in the set of abnormal users is less than a total number of the abnormal users in the plurality of to-be-moderated users and is greater than a product of the total number and a recall rate, the total number being a product of a predetermined proportion of the abnormal users and a number of the plurality of to-be-moderated users; and determining the to-be-moderated users in the set of abnormal users as the candidate users;

wherein traversing the set of abnormal users and the set of normal users, and recalculating the second function value of the total probability function comprise:

traversing the set of normal users, and determining first to-be-moderated users currently traversed in the set of normal users as the abnormal users;

upon the traverse of the first to-be-moderated users in the set of normal users, traversing the set of abnormal users, and determining second to-be-moderated users currently traversed in the set of abnormal users as the normal users;

calculating, upon the traverse of the second to-be-moderated users in the set of abnormal users, the second function value of the total probability function based on the current set of abnormal users and the current set of normal users;

acquiring a plurality of second function values by repeating processes of traversing the set of abnormal users, determining the second to-be-moderated users currently traversed in the set of abnormal users as the normal users, and calculating, upon the traverse of the second to-be-moderated users in the set of abnormal users, the second function value of the total probability function based on the current set of abnormal users and the current set of normal users until the set of abnormal users is traversed; and determining a minimum second function value in the plurality of second function values.

2. The method according to claim 1, wherein prior to acquiring the history behavior data of the plurality of to-be-moderated users, the method further comprises:

acquiring the sample data, wherein the sample data comprises valid features, and predetermined probabilities that users are the abnormal users upon occurrence of events associated with the valid features.

3. The method according to claim 2, wherein acquiring the sample data comprises:

acquiring history behavior data of a specific number of sample users, wherein the specific number of sample users are users with abnormal user tags and normal user tags;

extracting a plurality of valid features from the history behavior data of the specific number of sample users; and determining probabilities that the sample users are the abnormal users upon occurrence of the events associated with the valid features as the predetermined probabilities.

4. The method according to claim 3, wherein extracting the plurality of valid features from the history behavior data of the specific number of sample users comprises:

extracting a plurality of behavior features from the history behavior data of the specific number of sample users;

for each of the plurality of behavior features, acquiring a first user number of the sample users that are the abnormal users, including the each of the plurality of behavior features, and acquiring a second user number of the sample users that are the normal users, including the each of the plurality of behavior features;

acquiring a third user number of the abnormal users and a fourth user number of the normal users in the specific number of sample users;

calculating a first ratio of the first user number to the third user number and a second ratio of the second user number to the fourth user number;

calculating an absolute value of a difference value of the first ratio and the second ratio; and determining the plurality of behavior features as the valid features in response to the absolute value being greater than a predetermined threshold.

5. The method according to claim 1, wherein acquiring the history behavior data of the plurality of to-be-moderated users comprises:

acquiring the history behavior data of the plurality of to-be-moderated users from event tracking of a plurality of platforms, wherein the history behavior data comprises at least one of: user genders, videos liked by the users, comments by the users, accounts followed by the users, accounts following the users, videos shared by the users, a number of videos liked by the users, a number of videos posted by the users.

6. The method according to claim 1, wherein calculating, based on the predetermined probabilities of the events associated with the plurality of valid features, the probability that each of the plurality of to-be-moderated users is the abnormal user comprises:

acquiring the probability that each of the plurality of to-be-moderated users is the abnormal user by summing the predetermined probabilities of the events associated with the plurality of valid features.

7. The method according to claim 1, wherein initializing the set of abnormal users and the set of normal users, and organizing the plurality of to-be-moderated users to the set of abnormal users and the set of normal users comprise:

determining the plurality of to-be-moderated users as the normal users, and determining a set of to-be-moderated users acquired by solving the maximum value of the total probability function as the set of abnormal users; and determining a set of to-be-moderated users, other than the set of abnormal users, in the plurality of to-be-moderated users as the set of normal users.

8. The method according to claim 1, wherein updating the set of abnormal users and the set of normal users based on the first function value and the second function value comprises:

determining, in response to the minimum second function value being greater than the first function value, the second to-be-moderated users corresponding to the minimum second function value in the set of abnormal users; and determining the second to-be-moderated users corresponding to the minimum second function value as the normal users and shifting to the set of normal users, determining the currently traversed first to-be-moderated users as the abnormal users and shifting from the set of normal users to the set of abnormal users, and returning to processes of traversing the set of normal users, and determining the first to-be-moderated users currently traversed in the set of normal users as the abnormal users.

9. The method according to claim 1, wherein acquiring the abnormal users by moderating the candidate users comprises:

sending user identifiers of the candidate users to a moderation backend, such that the candidate users are artificially moderated in the moderation backend; and receiving moderation results sent by the moderation backend, wherein the moderation results comprises the abnormal users determined from the candidate users.

10. The method according to claim 9, wherein upon receiving the moderation results sent by the moderation backend, the method further comprises:

assigning abnormal user tags for the abnormal users and normal user tags for the users, other than the abnormal users, in the plurality of to-be-moderated users; and determining the users assigned the abnormal user tags or normal user tags as sample users, and updating the sample data.

11. An electronic device for moderating abnormal users, comprising:
at least one processor;
a memory, configured to store at least one program;
wherein the at least one processor, when loading and running the at least one program, is caused to perform a method for moderating abnormal users, wherein the method includes:
acquiring history behavior data of a plurality of to-be-moderated users, wherein the history behavior data comprises behavior data of interactions of the plurality of to-be-moderated users;
extracting a plurality of predetermined valid features from the history behavior data for each of the plurality of to-be-moderated users, wherein the predetermined valid features are features predetermined in sample data;
calculating, based on predetermined probabilities of events associated with the plurality of valid features, a probability that each of the plurality of to-be-moderated users is an abnormal user;
establishing a total probability function based on probabilities that the plurality of to-be-moderated users are the abnormal users;
determining candidate users by solving, based on predetermined conditions, a maximum value of the total probability function; and
determining the abnormal users by moderating the candidate users;
wherein the at least one processor, when loading and running the at least one program, is further caused to perform:
initializing a set of abnormal users and a set of normal users, and organizing the plurality of to-be-moderated users to the set of abnormal users and the set of normal users, wherein a probability that each of the plurality of to-be-moderated users is the abnormal user or the normal user is acquired by inputting the history behavior data of the plurality of to-be-moderated users to a pretrained classification model, and each of the plurality of to-be moderated users is organized to the set of abnormal users or the set of normal users based on the probability that each of the plurality of to-be-moderated users is the abnormal user or the normal user;
calculating a first function value of the total probability function based on the set of abnormal users and the set of normal users;
traversing the set of abnormal users and the set of normal users, and recalculating a second function value of the total probability function;
updating the set of abnormal users and the set of normal users based on the first function value and the second function value, returning to processes of traversing the set of abnormal users and the set of normal users, and recalculating the second function value of the total probability function until the set of normal users is traversed, wherein a number of the to-be-moderated users in the set of abnormal users is less than a total number of the abnormal users in the plurality of to-be-moderated users and is greater than a product of the total number and a recall rate, the total number being a product of a predetermined proportion of the abnormal users and a number of the plurality of to-be-moderated users; and determining the to-be-moderated users in the set of abnormal users as the candidate users;
wherein the at least one processor, when loading and running the at least one program, is further caused to perform:
traversing the set of normal users, and determining first to-be-moderated users currently traversed in the set of normal users as the abnormal users;
upon the traverse of the first to-be-moderated users in the set of normal users, traversing the set of abnormal users, and determining second to-be-moderated users currently traversed in the set of abnormal users as the normal users;
calculating, upon the traverse of the second to-be-moderated users in the set of abnormal users, the second function value of the total probability function based on the current set of abnormal users and the current set of normal users;
acquiring a plurality of second function values by repeating processes of traversing the set of abnormal users, determining the second to-be-moderated users currently traversed in the set of abnormal users as the normal users, and calculating, upon the traverse of the second to-be-moderated users in the set of abnormal users, the second function value of the total probability function based on the current set of abnormal users and the current set of normal users until the set of abnormal users is traversed; and
determining a minimum second function value in the plurality of second function values.

12. The electronic device for moderating abnormal users according to claim 11, wherein the at least one processor, when loading and running the at least one program, is caused to perform:
acquiring the sample data, wherein the sample data comprises valid features, and predetermined probabilities that users are the abnormal users upon occurrence of events associated with the valid features.

13. The electronic device for moderating abnormal users according to claim 12, wherein the at least one processor, when loading and running the at least one program, is caused to perform:
acquiring history behavior data of a specific number of sample users, wherein the specific number of sample users are users with abnormal user tags and normal user tags;
extracting a plurality of valid features from the history behavior data of the specific number of sample users; and
determining probabilities that the sample users are the abnormal users upon occurrence of the events associated with the valid features as the predetermined probabilities.

14. The electronic device for moderating abnormal users according to claim 13, wherein the at least one processor, when loading and running the at least one program, is caused to perform:
extracting a plurality of behavior features from the history behavior data of the specific number of sample users;
for each of the plurality of behavior features, acquiring a first user number of the sample users that are the abnormal users, including the each of the plurality of behavior features, and acquiring a second user number of the sample users that are the normal users, including the each of the plurality of behavior features;

acquiring a third user number of the abnormal users and a fourth user number of the normal users in the specific number of sample users;

calculating a first ratio of the first user number to the third user number and a second ratio of the second user number to the fourth user number;

calculating an absolute value of a difference value of the first ratio and the second ratio; and determining the plurality of behavior features as the valid features in response to the absolute value being greater than a predetermined threshold.

15. The electronic device for moderating abnormal users according to claim 11, wherein the at least one processor, when loading and running the at least one program, is caused to perform:

acquiring the history behavior data of the plurality of to-be-moderated users from event tracking of a plurality of platforms, wherein the history behavior data comprises at least one of: user genders, videos liked by the users, comments by the users, accounts followed by the users, accounts following the users, videos shared by the users, a number of videos liked by the users, a number of videos posted by the users.

16. The electronic device for moderating abnormal users according to claim 11, wherein the at least one processor, when loading and running the at least one program, is caused to perform:

acquiring the probability that each of the plurality of to-be-moderated users is the abnormal user by summing the predetermined probabilities of the events associated with the plurality of valid features.

17. A non-transitory computer-readable storage medium, storing one or more computer programs, wherein the one or more computer programs, when loaded and run by a processor, causes the processor to perform:

acquiring history behavior data of a plurality of to-be-moderated users, wherein the history behavior data comprises behavior data of interactions of the plurality of to-be-moderated users;

extracting a plurality of predetermined valid features from the history behavior data for each of the plurality of to-be-moderated users, wherein the predetermined valid features are features predetermined in sample data;

calculating, based on predetermined probabilities of events associated with the plurality of valid features, a probability that each of the plurality of to-be-moderated users is an abnormal user;

establishing a total probability function based on probabilities that the plurality of to-be-moderated users are the abnormal users;

determining candidate users by solving, based on predetermined conditions, a maximum value of the total probability function; and determining the abnormal users by moderating the candidate users;

wherein the one or more computer programs, when loaded and run by a processor, causes the processor to perform:

initializing a set of abnormal users and a set of normal users, and organizing the plurality of to-be-moderated users to the set of abnormal users and the set of normal users, wherein a probability that each of the plurality of to-be-moderated users is the abnormal user or the normal user is acquired by inputting the history behavior data of the plurality of to-be-moderated users to a pretrained classification model, and each of the plurality of to-be moderated users is organized to the set of abnormal users or the set of normal users based on the probability that each of the plurality of to-be-moderated users is the abnormal user or the normal user;

calculating a first function value of the total probability function based on the set of abnormal users and the set of normal users;

traversing the set of abnormal users and the set of normal users, and recalculating a second function value of the total probability function;

updating the set of abnormal users and the set of normal users based on the first function value and the second function value, returning to processes of traversing the set of abnormal users and the set of normal users, and recalculating the second function value of the total probability function until the set of normal users is traversed, wherein a number of the to-be-moderated users in the set of abnormal users is less than a total number of the abnormal users in the plurality of to-be-moderated users and is greater than a product of the total number and a recall rate, the total number being a product of a predetermined proportion of the abnormal users and a number of the plurality of to-be-moderated users; and determining the to-be-moderated users in the set of abnormal users as the candidate users;

wherein the one or more computer programs, when loaded and run by a processor, causes the processor to perform:

traversing the set of normal users, and determining first to-be-moderated users currently traversed in the set of normal users as the abnormal users;

upon the traverse of the first to-be-moderated users in the set of normal users, traversing the set of abnormal users, and determining second to-be-moderated users currently traversed in the set of abnormal users as the normal users;

calculating, upon the traverse of the second to-be-moderated users in the set of abnormal users, the second function value of the total probability function based on the current set of abnormal users and the current set of normal users;

acquiring a plurality of second function values by repeating processes of traversing the set of abnormal users, determining the second to-be-moderated users currently traversed in the set of abnormal users as the normal users, and calculating, upon the traverse of the second to-be-moderated users in the set of abnormal users, the second function value of the total probability function based on the current set of abnormal users and the current set of normal users until the set of abnormal users is traversed; and determining a minimum second function value in the plurality of second function values.

* * * * *